United States Patent [19]

Kingston

[11] 4,347,030

[45] Aug. 31, 1982

[54] WHEELCHAIR LOADING DEVICE FOR TRAINS

[76] Inventor: John C. Kingston, Suite 1210, 261 Cooper St., Ottawa, Ontario, Canada, K2P 0G3

[21] Appl. No.: 165,554

[22] Filed: Jul. 3, 1980

Related U.S. Application Data

[63] Continuation-in-part of Ser. No. 14,604, Feb. 23, 1979, abandoned.

[30] Foreign Application Priority Data

Oct. 31, 1978 [CA] Canada .................................. 315540

[51] Int. Cl.[3] ................................................ B60P 1/48

[52] U.S. Cl. .................................... 414/556; 105/426; 362/76; 414/546; 414/917; 414/921

[58] Field of Search ............... 414/545, 546, 556, 557, 414/921; 105/426, 430-433, 437, 438, 443, 450; 280/166; 362/76

[56] References Cited

U.S. PATENT DOCUMENTS

| | | | |
|---|---|---|---|
| 958,542 | 5/1910 | Ricketts | 362/76 |
| 3,724,396 | 4/1973 | Roth | 105/426 X |
| 3,893,697 | 7/1975 | Blitz et al. | 414/546 |
| 4,029,223 | 6/1977 | Adamski et al. | 414/546 |
| 4,124,130 | 11/1978 | Rohrs et al. | 414/921 X |
| 4,273,498 | 6/1981 | Dickhart et al. | 414/556 |

*Primary Examiner*—Robert G. Sheridan
*Attorney, Agent, or Firm*—Frishauf, Holtz, Goodman & Woodward

[57] ABSTRACT

This invention relates to a novel loading and detraining apparatus for use by wheelchair confined and other handicapped passengers. One embodiment of the invention makes provision for the loading and detraining of such passengers at the entrances to railway coaches and more particularly over the stairwell in a vestibule of such coaches. A horizontal loading platform is pivotally connected to a pair of spaced apart and opposed linkage means positioned on either side thereof and which are in turn pivotally connected to the coach. Each linkage means comprises three linkage sections which are so arranged as to define two co-operating parallelograms having one common side which is parallel to the loading platform. Electrically, pneumatically or hydraulically powered motive means is operatively connected to said linkage sections so as to rotate such sections about their pivotal connections to the coach thus raising and lowering the loading platform, at coach entrance, between coach floor elevation inboard template line of coach and railway station platform outboard template line of coach.

6 Claims, 4 Drawing Figures

WHEELCHAIR LOADING DEVICE FOR TRAINS

This application is a continuation-in-part of my prior application, U.S. Ser. No. 14,604 filed Feb. 23, 1979, entitled: "WHEELCHAIR LOADING DEVICE FOR TRAINS" now abandoned.

BACKGROUND OF THE INVENTION

The present invention relates to lifting devices and more particularly to lifting devices especially suited to loading and detraining wheelchair confined railway passengers and other handicapped travellers in a safe, convenient, confidence assuring and comfortable manner at railway station platforms.

BRIEF SUMMARY OF INVENTION

In general, the apparatus of this invention comprises a device including a loading platform which can be lowered by motive power means from rest position at floor elevation interior of a railway coach to a position on a railway station platform outboard template line of coach where a wheelchair passenger can roll his wheelchair from said station platform onto the loading platform and then be raised by said motive power means to an elevation interior of railway coach where he can roll his wheelchair off the loading platform further into said coach. Conversely, when said loading platform is at a position adjacent or in a railway coach, a wheelchair confined passenger can be put on the loading platform and then lowered on the loading platform down to the station platform from where the wheelchair passenger can roll his wheelchair off the loading platform and onto the station platform.

In accordance with one embodiment of this invention which is particularly suited for loading and detraining wheelchair confined passengers over the stairwell existing in conventional coaches, there is provided in the vestibule a horizontal loading platform to which is attached a pair of spaced apart and opposed linkage means arranged on either side thereof. This linkage means is employed to pivotally interconnect the loading platform to the railway coach at the vestibule entry. Each linkage means comprises three linkage sections which are so arranged as to define two co-operating parallelograms having one common side which is parallel to the loading platform. Motive means such as motor driven geared mechanisms, hydraulic or pneumatic cylinder-piston mechanisms or motor driven feedscrew mechanisms are utilized in raising and lowering the loading platform over the stairwell between the coach floor elevation and a railway station platform.

In this connection, a first (outboard) and a second (inboard) linkage section in each of the linkage means are preferably each pivotally connected to the loading platform and to the coach and are pivotally interconnected to each other by a third linkage section which forms the one common side of the two parallelograms. In order to maintain the loading platform horizontal during the raising and lowering movement and to retain the integrity of the parallelograms, the distance between the pivotal connections of the first and second linkage sections with the loading platform is equal to the distance between pivotal connections of the first and second linkage sections with the coach. Furthermore, the distance between the pivotal connections of the first and second linkage sections with the third linkage section is also equal. In this configuration, relative to the coach, the pivotal connections of the first linkage section to the loading platform to the coach and to the third linkage section are outboard of the corresponding pivotal connections of the second linkage sections to the loading platform, to the coach and to the third linkage section. Furthermore, when loading platform rests on station platform, pivotal connections of second linkage sections to loading platform lie outboard of pivotal connections of first linkage sections to coach.

I have found that the first and second linkage sections may each be constructed in the form of a triangular frame, with the third linkage section pivotally interconnecting these frames. Indeed, the triangular frame sections can each define a right angle triangle with the third linkage section pivotally interconnecting the two right angle frames at their respective right angles.

In situations where the coach vestibule, stairwell and elevation of station platform do not permit, it may not be possible to employ identical first and second triangular linkage sections if full movement of the loading platform is to be acheived. In such instances I have found that the hypotenuse portion of the second linkage section can be advantageously deflected inwardly of its triangular configuration so that it is disposed above the pivotal connection of the first linkage section with the coach. This deflection facilitates complete lowering of the loading platform onto the railway station platform, outside the template line of the coach, in instances where the first linkage section is pivotally connected to the coach and the second linkage is constrained to overlie the first linkage pivotal connection to the coach.

As security for the wheelchair confined passenger is important from the standpoint of safety, the loading platform may advantageously include a retractable, wheel engaging means, herein called chocks, which may be actuated by motive power or manual lever, operated by wheelchair occupant or attendant, for releasably retaining a wheelchair whilst positioned on the loading platform. If required, the loading platform may also include a hand rail and retaining bars which can be closed before and behind the passenger while being transported on the platform as well as a translucent section of plate set in its surface between the chocks and beneath which electric lighting is installed to facilitate positioning of wheelchair during night operation.

As a time saving measure in boarding and detraining unhandicapped passengers, a trap door, which opens and closes in the same manner as current vestibule trapdoors, may be installed in the loading platform so that the loading platform need be deployed only when transferring the handicapped. When such trapdoor is installed in a loading platform the chock actuating mechanism, which may be manual or pneumatic, is contained within the trapdoor, and the ramp, with its attendant fold-back, is located at the outboard end of the trapdoor.

BRIEF DESCRIPTION OF THE DRAWINGS

In the accompanying drawings which illustrate various embodiments of my invention.

DETAILED DESCRIPTION OF THE DRAWINGS

Figure 1:
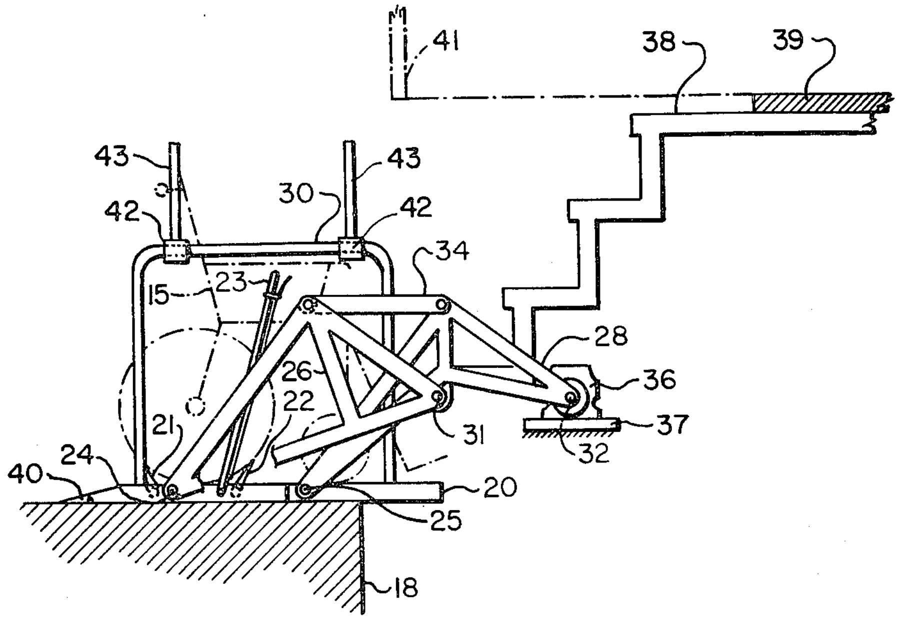
FIG. 1 is a side view of the railway coach stairwell and vestibule with the loading platform outside the template line of said coach and in position to raise a wheelchair confined passenger or other disabled passenger from a railway station platform to the vestibule floor inside template line of a railway coach.
Figure 2:
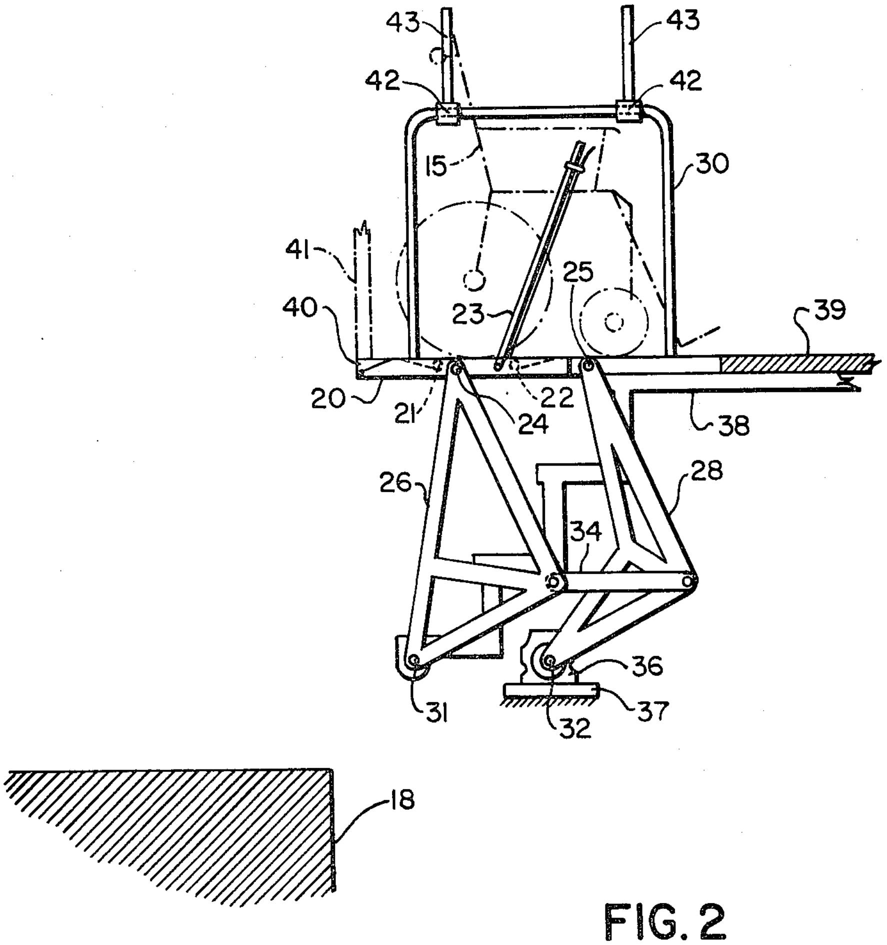
FIG. 2 is a side view of the railway coach stairwell and vestibule depicted in FIG. 1 when the loading platform has been raised to the elevation of the vestibule floor inside template line of said coach and the wheelchair is in position to be rolled further into the vestibule.

Referring in detail to the drawings of the present invention, FIGS. 1 and 2 depict a loading platform means of transferring a wheelchair passenger between a railway station platform and a railway coach vestibule, FIG. 1 showing the "on station platform" position and FIG. 2 the "at vestibule position". It consists of a wheelchair generally indicated by broken outline 15, a loading platform 20, an outboard set of chocks 21 and an inboard set of chocks 22 which can be raised and lowered by chock lever 23 or other suitable mechancial means so as to restrain movement of the wheelchair 15 while it is being transferred between station platform 18 and railway coach vestibule.

An outboard shaft 24 and an inboard shaft 25 pass horizontally through and are rigidly fixed to side members of the loading platform. The outboard ends of linkages 26 are pivotally attached to shafts 24 while the outboard ends of linkages 28 are pivotally attached to shafts 25. Linkage sections 34 pivotally interconnect linkage sections 26 and 28.

Shaft 32 which extends from electrically powered motive means 36 and 31, which is outboard of shaft 32, are located beneath the stairway of the vestibule. The inboard end of linkages 26 are pivotally connected to shaft 31 and the inboard ends of linkages 28 are firmly connected to shaft 32 in such a manner that rotation of shaft 32 by said electrically powered motive means 36 will cause linkages 28 to rotate about 32 and through linkages 34 cause linkages 26 to rotate in unison with 28 so as to cause a raising and lowering of loading platform 20 between railway station platform 18 and railway coach vestibule floor 38 where it butts against false floor 39.

The electrically powered motive means 36 is connected to the railway coach by means of foundation plate 37.

For additional safety hand hold rail indicated at 30 may be installed on loading platform 20 and for further security front and rear wheelchair restraining bars indicated at 43 can be used and are inserted in or attached to sleeves 42 in such a manner that said restraining bars, with their associated sleeves 42, can be rotated about hand rail 30 from vertical to horizontal over said loading platform.

Figure 3:
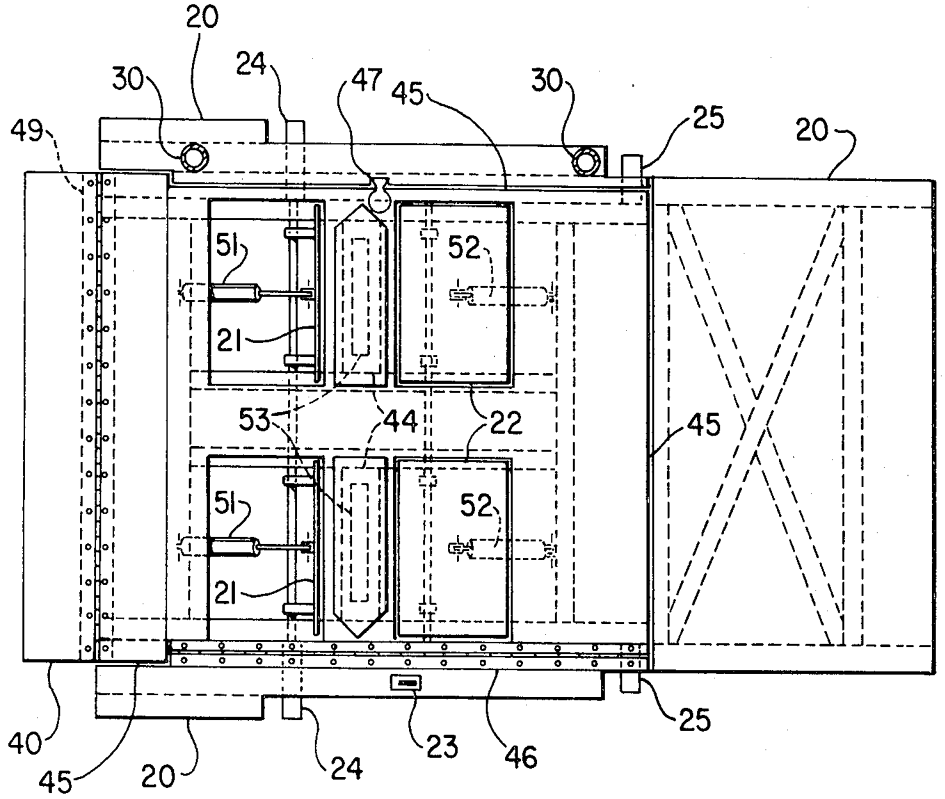
FIG. 3 is a plan view of the loading platform showing the trapdoor in the down (closed) position with the ramp fold-back extended. The wheel engaging means (chocks) are shown one horizontal and one vertical for illustrative purposes, though in practice they would have the same inclination when engaging a wheelchair wheel.

As indicated in FIG. 3, loading platform 20 can include a trapdoor 45 advantageously installed therein and rotatable about hinge 46 or other pivotal means, and lockable in horizontal position by latching means 47. Trapdoor 45 advantageously includes an inclined ramp generally indicated at 40 which can be folded back upon itself by rotation about hinge 49 or other pivotal means so as to be within the vestibule thus creating a seal to the bottom of the vestibule entrance door of the railway coach indicated by broken chain-line 41 in FIGS. 1 and 2.

Figure 4:
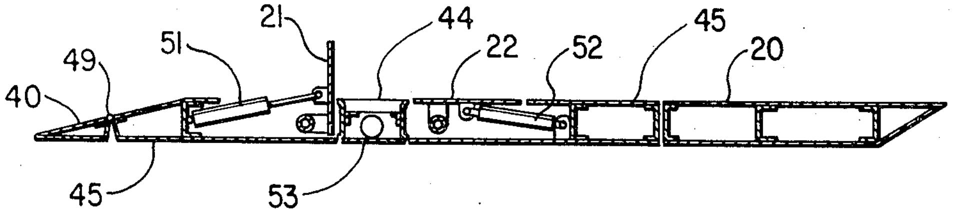
FIG. 4 is a section along the longitudinal centre line of the loading platform.

In FIGS. 3 and 4, for illustrative purposes, chocks 21 are indicated in the "up" position in trapdoor 45 and chocks 22, likewise located, are indicated in a "down" position, though when deployed, chocks are elevated to the same inclination when restraining movement of the large or the small wheelchair wheels. Pneumatic cylinders 51 and 52, when actuated by a valve controlled by chock lever 23, raise and lower chocks 21 and 22. Translucent plates 44 and fluorescent lighting tubes 53, advantageously installed in trapdoor 45, are depicted in FIGS. 3 and 4. Shafts 24 and 25, to which linkage arms are pivotally connected when the complete mechanism is assembled, are indicated in FIG. 3, as also are the platform penetration locations for handrail 30.

FIG. 4 is a section through the longitudinal centre line of the loading platform 20 and the trapdoor 45, showing the ramp foldback 40, fold-back hinge 49, pneumatic cylinders 51 and 52, translucent plates 44, fluorescent lighting tube 53 and chocks 21 and 22 on either side of said translucent plates.

I claim:

1. A device for loading and detraining wheelchair confined passengers at an entrance to a railway coach comprising, a movable horizontal loading platform and a pair of spaced apart and opposed linkage means arranged on either side of the entrance for pivotally connecting said loading platform to said coach, each of said linkage means comprising three linkage sections which define two co-operating parallelograms, the first and second of said sections each defining a triangular frame and being pivotally connected to said loading platform and said coach and pivotally connected to each other by the third of said linkage sections, wherein each triangular frame approximates a right angled frame and wherein the pivotal connections of the first and second linkage sections with the coach are below the coach stairwell and wherein the hypotenuse portion of the second linkage section is deflected inwardly of the triangular frame and disposed above the pivotal connection of the first linkage section with the coach;

said third linkage section constituting a side which is common to said two co-operating parallelograms and which is parallel to said loading platform, whereby the distance between the pivotal connections of the first and second linkage sections at the loading platform, the distance between the pivotal connections of the first and second linkage sections at the coach and the distance between the pivotal connections of the third linkage section with the first and second linkage sections are all equal and wherein, when said loading platform is interior of said coach, the pivotal connection of said second linkage section with said loading platform is inboard of the coach relative to the pivotal connection of said first linkage section with said coach, and when said loading platform is exterior of the coach the the pivotal connection of said second linkage section with said loading platform is outboard of the coach relative to the pivotal connection of said first linkage section with said coach.

2. The device as claimed in claim 1, wherein said loading platform further includes a mechanically actuated, retractable wheel engaging means for releasably retaining a wheelchair placed thereon in a fixed position.

3. The device as claimed in claim 1, wherein said loading platform further includes at least one hand rail to which are pivotally attached inboard and outboard retaining bars for positioning ahead of and behind a wheelchair placed on said loading platform.

4. The device as claimed in claim 1, wherein said loading platform further includes a translucent floor portion and lighting means carried by said loading platform.

5. The device as claimed in claim 1, wherein said loading platform further includes a trapdoor means which can be opened to allow use of the vestibule stairs when said loading platform is not deployed.

6. The device according to claim 1, wherein said loading platform includes a mechanically activated retractable wheel engaging means for releasably retaining a wheelchair placed thereon in a fixed position and further includes trapdoor means for exposing an underlying stairwell at said railway coach entrance.

* * * * *